US 9,969,573 B2

United States Patent
Girtman et al.

(10) Patent No.: US 9,969,573 B2
(45) Date of Patent: May 15, 2018

(54) ROBOTIC CARTON UNLOADER

(71) Applicant: Intelligrated Headquarters, LLC, Mason, OH (US)

(72) Inventors: Michael Girtman, O'Fallon, MO (US); Matthew Wicks, Saint Charles, MO (US)

(73) Assignee: Intelligrated Headquarters, LLC, Mason, OH (US)

( * ) Notice: Subject to any disclaimer, the term of this patent is extended or adjusted under 35 U.S.C. 154(b) by 282 days.

(21) Appl. No.: 14/279,694

(22) Filed: May 16, 2014

(65) Prior Publication Data
US 2014/0341694 A1 Nov. 20, 2014

Related U.S. Application Data

(60) Provisional application No. 61/824,550, filed on May 17, 2013.

(51) Int. Cl.
*B65G 59/02* (2006.01)
*B65G 67/24* (2006.01)
(Continued)

(52) U.S. Cl.
CPC ............ *B65G 67/24* (2013.01); *B25J 9/0093* (2013.01); *B25J 11/00* (2013.01); *B25J 15/10* (2013.01); *B65G 59/02* (2013.01)

(58) Field of Classification Search
CPC .......... B25J 9/0093; B25J 11/00; B25J 15/10; B65G 67/24; B65G 59/02; B65G 69/008; B65G 37/005
(Continued)

(56) References Cited

U.S. PATENT DOCUMENTS 2,305,512 A 12/1942 Broekhuysen
2,596,265 A 5/1952 Manierre
(Continued)

FOREIGN PATENT DOCUMENTS

DE 37 33 461 A1 4/1989
DE 103 24 755 A1 9/2004
(Continued)

OTHER PUBLICATIONS

International Search Report and Written Opinion dated Sep. 12, 2014 for Application No. PCT/US2014/038513.
(Continued)

*Primary Examiner* — Anna M Momper
*Assistant Examiner* — Lynn E Schwenning
(74) *Attorney, Agent, or Firm* — Alston & Bird LLP

(57) ABSTRACT

A robotic carton unloader for automatic unloading of cartons from a carton pile stacked within a trailer. In various embodiments, a robotic carton unloader may comprise a conveyor system, a manipulator movably attached to an end of a robotic positioner and configured to dislodge one or more cartons from a carton pile; and a frame comprising a bumper configured to be pressed against the carton pile below one or more cartons being dislodged from the carton pile by the manipulator to stabilize the carton pile below the one or more cartons being dislodged; and a shelf configured to catch the one or more cartons dislodged from the carton pile and guide the one or more cartons dislodged from the carton pile onto the conveyor system.

20 Claims, 5 Drawing Sheets

(51) Int. Cl.
    *B25J 9/00* (2006.01)
    *B25J 11/00* (2006.01)
    *B25J 15/10* (2006.01)

(58) Field of Classification Search
    USPC ......... 414/795.4, 795.7, 795.9, 796.2, 796.4,
                 414/796.5, 796.6; 198/540, 562
    See application file for complete search history.

(56) References Cited

U.S. PATENT DOCUMENTS

| | | | |
|---|---|---|---|
| 2,605,912 A | 8/1952 | Small et al. | |
| 3,651,963 A | 3/1972 | McWilliams | |
| 3,715,043 A | 2/1973 | Weir | |
| 3,837,510 A | 8/1974 | McWilliams | |
| 3,836,021 A * | 9/1974 | McWilliams | B65G 67/08 198/524 |
| 3,850,313 A | 11/1974 | Rackman et al. | |
| 3,853,230 A * | 12/1974 | Schultz | B60P 1/52 414/392 |
| 4,194,269 A * | 3/1980 | Reiche | D01G 7/04 19/81 |
| 4,242,025 A | 12/1980 | Thibault | |
| 4,252,495 A | 2/1981 | Cook | |
| 4,281,955 A | 8/1981 | McWilliams | |
| 4,405,276 A * | 9/1983 | Wiegand | B65G 59/026 271/42 |
| 4,441,844 A * | 4/1984 | Miller | B65G 59/02 225/103 |
| 4,597,707 A | 7/1986 | Cornacchia | |
| 4,687,428 A * | 8/1987 | Martin | B29C 31/00 118/317 |
| 4,692,876 A | 9/1987 | Tenma et al. | |
| 4,721,005 A | 1/1988 | Yoshiji et al. | |
| 4,747,193 A | 5/1988 | Hashidate et al. | |
| 4,802,377 A | 2/1989 | Keppler | |
| 4,836,111 A | 6/1989 | Kaufmann | |
| 4,941,794 A | 7/1990 | Hara et al. | |
| RE33,416 E | 10/1990 | Konishi et al. | |
| 4,968,214 A | 11/1990 | Shiotani | |
| 4,976,584 A | 12/1990 | Focke | |
| 5,009,560 A | 4/1991 | Ruder et al. | |
| 5,015,145 A | 5/1991 | Angell et al. | |
| 5,067,867 A | 11/1991 | Ruder et al. | |
| 5,096,367 A * | 3/1992 | Winski | B65G 59/005 414/795.3 |
| 5,108,255 A | 4/1992 | Cornacchia | |
| 5,201,626 A | 4/1993 | Hansen | |
| 5,222,857 A * | 6/1993 | Hasegawa | B65G 59/023 414/788.4 |
| 5,256,021 A | 10/1993 | Wolf et al. | |
| 5,325,953 A | 7/1994 | Doster et al. | |
| 5,388,948 A | 2/1995 | Jerome | |
| 5,391,038 A | 2/1995 | Stewart | |
| 5,462,400 A * | 10/1995 | Bonnet | B65G 59/023 198/785 |
| 5,466,116 A | 11/1995 | Jerome | |
| 5,476,358 A | 12/1995 | Costa | |
| 5,524,747 A * | 6/1996 | Wohlfahrt | B65G 59/023 198/512 |
| 5,605,432 A | 2/1997 | Fink et al. | |
| 5,615,993 A * | 4/1997 | Tanaka | B65G 1/1376 414/412 |
| 5,642,803 A | 7/1997 | Tanaka | |
| 5,671,962 A * | 9/1997 | Otsuka | B25J 9/1612 294/119.1 |
| 5,685,416 A | 11/1997 | Bonnet | |
| 5,694,753 A | 12/1997 | Dellinger | |
| 5,697,753 A | 12/1997 | Aurora et al. | |
| 5,716,184 A | 2/1998 | Lowe et al. | |
| 5,718,325 A | 2/1998 | Doster et al. | |
| 5,738,487 A | 4/1998 | Schaede et al. | |
| 5,743,705 A | 4/1998 | Eissfeller | |
| 5,913,655 A * | 6/1999 | Maday | B65G 59/02 198/592 |
| 5,921,740 A | 7/1999 | Stewart | |
| 5,984,621 A | 11/1999 | Letson | |
| 5,997,240 A | 12/1999 | Focke et al. | |
| 6,116,841 A | 9/2000 | Iwasaki | |
| 6,234,737 B1 | 5/2001 | Young et al. | |
| 6,238,175 B1 | 5/2001 | Götz et al. | |
| 6,484,862 B1 | 11/2002 | Gilmore et al. | |
| 6,502,877 B2 | 1/2003 | Schick et al. | |
| 6,545,440 B2 | 4/2003 | Slater et al. | |
| 6,629,594 B2 | 10/2003 | Nagel et al. | |
| 6,634,686 B2 | 10/2003 | Hosokawa | |
| 6,860,531 B2 | 3/2005 | Sherwin | |
| 6,923,085 B2 | 8/2005 | Nakano | |
| 7,048,492 B2 * | 5/2006 | Spatafora | B65G 61/00 414/795.9 |
| 7,108,125 B2 | 9/2006 | Gilmore et al. | |
| 7,168,910 B2 | 1/2007 | Keller | |
| 7,387,485 B2 | 6/2008 | Dickey et al. | |
| 7,469,782 B2 | 12/2008 | Hutton | |
| 7,641,043 B2 * | 1/2010 | Vestergaard | B64D 9/00 193/35 R |
| 7,641,247 B2 | 1/2010 | Blonigan et al. | |
| 7,648,329 B2 | 1/2010 | Chilson et al. | |
| 7,748,761 B2 | 7/2010 | Simons | |
| 7,967,543 B2 | 6/2011 | Criswell et al. | |
| 7,994,793 B2 | 8/2011 | Matsumoto et al. | |
| 8,011,706 B2 | 9/2011 | Schmidt et al. | |
| 8,086,343 B2 | 12/2011 | Slocum, III | |
| 8,151,969 B2 | 4/2012 | Hoene | |
| 8,162,362 B2 | 4/2012 | Braunschweiger et al. | |
| 8,262,334 B2 | 9/2012 | Christensen et al. | |
| 8,295,980 B2 | 10/2012 | Williamson | |
| 8,325,458 B2 | 12/2012 | Prahlad et al. | |
| 8,473,094 B2 * | 6/2013 | Becker | B65G 47/914 294/65 |
| 8,562,276 B2 | 10/2013 | Helmner | |
| 8,562,277 B2 | 10/2013 | Criswell | |
| 8,599,531 B2 | 12/2013 | Sundar et al. | |
| 8,651,794 B2 | 2/2014 | Pippin | |
| 9,604,797 B2 * | 3/2017 | Heitplatz | B65G 67/08 |
| 2001/0014268 A1 | 8/2001 | Bryson, III et al. | |
| 2002/0092728 A1 | 7/2002 | Tanaka | |
| 2004/0071539 A1 | 4/2004 | Anater, Jr. et al. | |
| 2004/0179924 A1 | 9/2004 | Lundahl et al. | |
| 2008/0267756 A1 | 10/2008 | Echelmeyer et al. | |
| 2010/0092272 A1 * | 4/2010 | Echelmeyer | B65G 61/00 414/591 |
| 2010/0104403 A1 | 4/2010 | Cho et al. | |
| 2010/0162694 A1 * | 7/2010 | Angleitner | B65G 61/00 60/327 |
| 2010/0178137 A1 | 7/2010 | Chintalapati et al. | |
| 2012/0076629 A1 | 3/2012 | Goff et al. | |
| 2012/0207572 A1 | 8/2012 | Enenkel | |
| 2012/0207577 A1 | 8/2012 | Stollery et al. | |

FOREIGN PATENT DOCUMENTS

| | | | |
|---|---|---|---|
| DE | 20 2004 009 581 U1 | 10/2004 | |
| DE | 10 2010 033 115 A1 | 2/2012 | |
| EP | 2 156 927 A1 | 2/2010 | |
| EP | 2444341 * | 4/2012 | ............ B65G 67/08 |
| EP | 2 570 372 A1 | 3/2013 | |
| JP | H05-105235 | 4/1993 | |
| JP | H05-208731 | 8/1993 | |
| JP | H09-301538 | 11/1997 | |
| JP | 2004-289680 | 10/2004 | |
| WO | WO 96/30287 | 10/1996 | |
| WO | WO 98/51598 | 11/1998 | |
| WO | WO 01/51356 | 7/2001 | |
| WO | WO 2004/050518 | 6/2004 | |
| WO | WO 2006/121329 | 11/2006 | |
| WO | WO 2011/129699 | 10/2011 | |
| WO | WO 2012/016974 * | 2/2012 | ............ B65G 67/08 |
| WO | WO-2013/042184 A | 3/2013 | |

(56) References Cited

FOREIGN PATENT DOCUMENTS

WO     WO 2013117177    *   8/2013   ............ B65G 61/00
WO     WO 2015/017444       2/2015

OTHER PUBLICATIONS

International Search Report and Written Opinion dated Jun. 15, 2015 for Application No. PCT/US2015/023744.
Extended European Search Report for European Patent Application No. 14797635.1 dated Oct. 25, 2016, 7 pages.

* cited by examiner

ROBOTIC CARTON UNLOADER

CROSS REFERENCE TO RELATED APPLICATIONS

This application claims priority to U.S. Provisional Patent Application Ser. No. 61/824,550, filed May 17, 2013, entitled "Robotic Carton Unloader", the entire contents of which are incorporated by reference herein.

BACKGROUND

The present disclosure relates generally to an apparatus for handling products, and more particularly directed to an automatic case unloader designed to unload product, such as cardboard cases of various sizes, from within a trailer.

Trucks and trailers loaded with cargo and products move across the country to deliver products to commercial loading and unloading docks at stores, warehouses, and distribution centers. Trucks can have a trailer mounted on the truck, or can be of a tractor-semi trailer configuration. To lower overhead costs at retail stores, in-store product counts have been reduced, and products-in-transit now count as part of available store stock. Unloading trucks quickly at the unloading docks of warehouses and regional distribution centers has attained new prominence as a way to refill depleted stock.

Trucks are typically unloaded with forklifts if the loads are palletized and with manual labor if the products are stacked within the trucks. Unloading large truck shipments manually with human laborers can be physically difficult, and can be costly due to the time and labor involved. Consequently, a need exists for an improved unloading system that can unload bulk quantities of stacked cases and cargo from truck trailers more quickly than human laborers and at a reduced cost.

SUMMARY

Various embodiments include a robotic carton unloader for automatic unloading of cartons from a carton pile stacked within a trailer. In various embodiments, a robotic carton unloader may comprise a conveyor system, a manipulator movably attached to an end of a robotic positioner and configured to dislodge one or more cartons from a carton pile; and a frame comprising a bumper configured to be pressed against the carton pile below one or more cartons being dislodged from the carton pile by the manipulator to stabilize the carton pile below the one or more cartons being dislodged; and a shelf configured to catch the one or more cartons dislodged from the carton pile and guide the one or more cartons dislodged from the carton pile onto the conveyor system.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the present invention.

DETAILED DESCRIPTION

Figure 1:
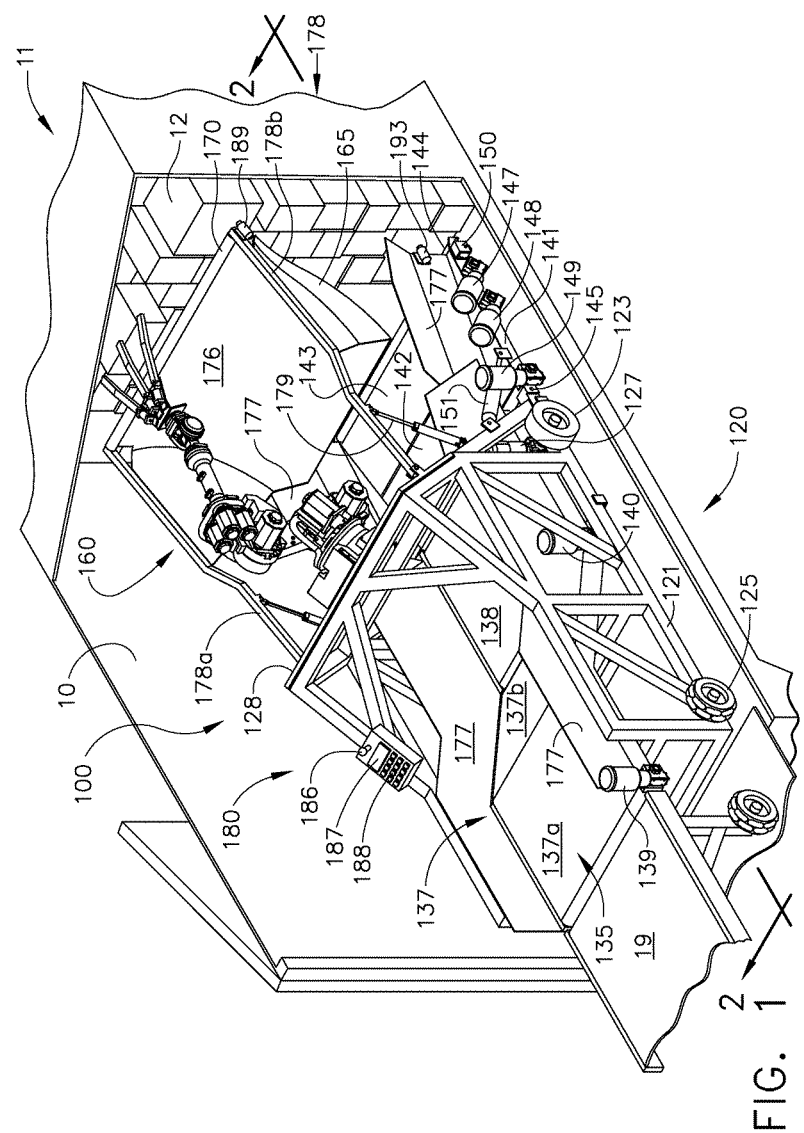
FIG. 1 is an isometric view of an embodiment of a robotic carton unloader maneuvering within a truck to unload product, such as cartons depicted as a pile of cartons, stacked within the truck.

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations. References made to particular examples and implementations are for illustrative purposes and are not intended to limit the scope of the invention or the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference.

The word "exemplary" is used herein to mean "serving as an example, instance, or illustration." Any implementation described herein as "exemplary" is not necessarily to be construed as preferred or advantageous over other implementations.

FIGS. 1-6 generally show an embodiment of a robotic carton unloader 100 for unloading cartons 12 from within a truck or semi-trailer 10. For instance, robotic carton unloader 100 may be configured to be driven into semi-trailer 10, dislodge or remove cartons 12 from carton wall or carton pile 11 stacked on floor 18 of semi-trailer 10, and transfer or unload the dislodged cartons 12 from semi-trailer 10. Cartons 12 may then be transferred into a store, warehouse or distribution center unloading bay. Cartons 12 may be any kind of product container for conveying products such as, but not limited to, cardboard cartons. Robotic carton unloader 100 may include a mobile body 120 sized and configured to be driven in and out of semi-trailer 10. Robotically controlled carton remover system 160 may be positioned on mobile body 120 and may extend from mobile body 120 toward carton pile 11 to dislodge and unload cartons 12 from carton pile 11. For instance, robotically controlled carton remover system 160 may dislodge and unload cartons 12 from a front and a top of carton pile 11. Carton guide system 175 may be located adjacent to (e.g., below) carton remover system 160 to catch cartons 12 as they are dislodged from pile 11. Carton guide system 175 may also guide cartons 12 onto and along conveyor system 135 that may extend from one end of robotic carton unloader 100 to the other end of robotic carton unloader 100. Conveyor system 135 may discharge unloaded cartons 12 at the end portion of robotic carton unloader 100 for collection (e.g., by laborers) or to a distribution center conveyor 19. Control and visualization system 180 may be provided to control and automate the unloading process, and to operate robotic carton unloader 100. Each of these components will be discussed in further detail below.

Mobile Body

Figure 2:
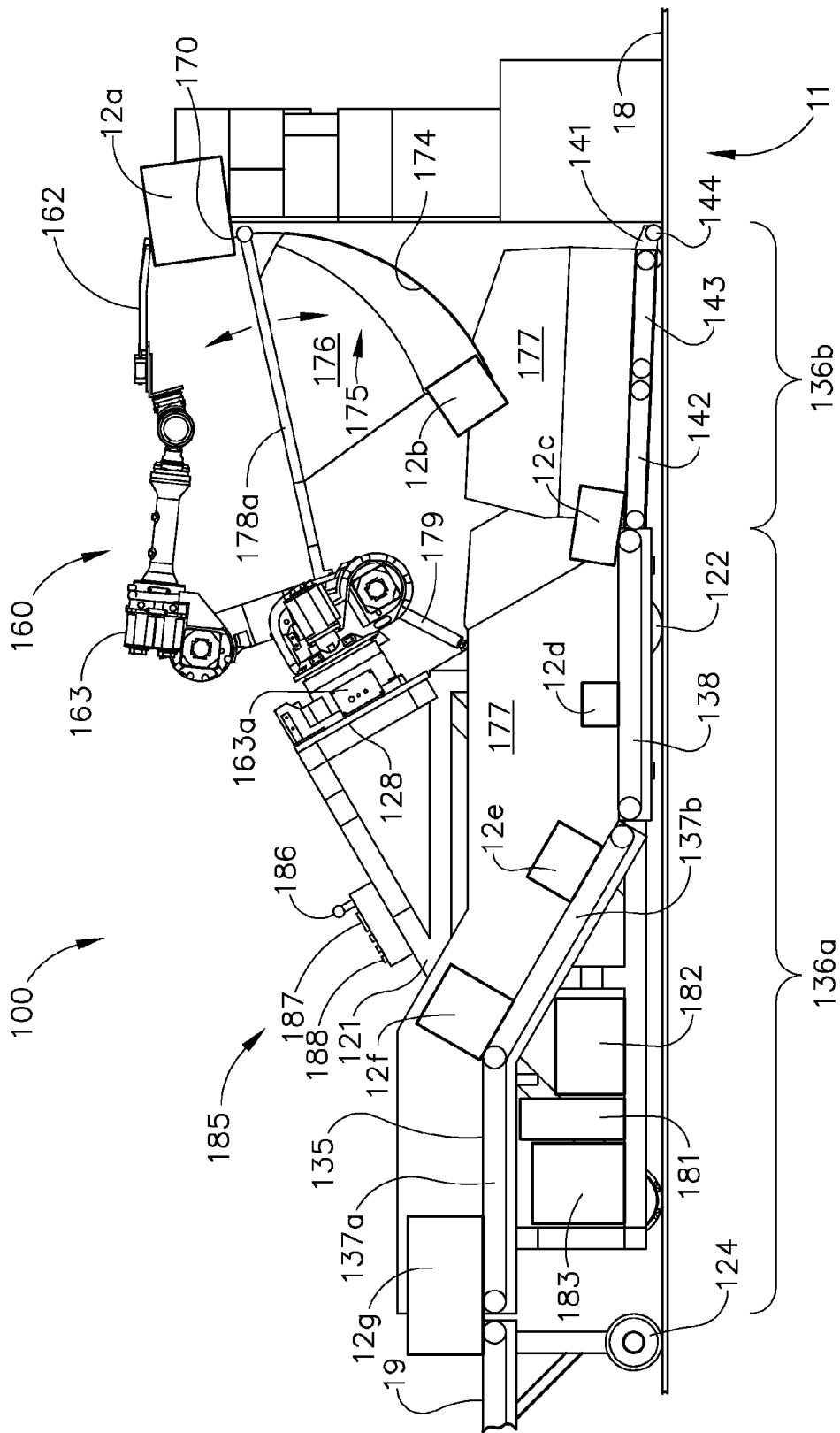
FIG. 2 is a side sectional view of the robotic carton unloader of FIG. 1 taken along line 2-2 of FIG. 1, showing a carton being unloaded from the pile of cartons and discharged onto an unloading dock conveyor.

As shown in FIGS. 1 and 2, mobile body 120 of robotic carton unloader 100 comprises chassis 121 movably supported on a four wheel configuration with each wheel 122, 123, 124, 125 adjacent to a corner of chassis 121. As an example, the chassis 121 may be a generally rectangular chassis with each wheel 122, 123, 124, and 125 adjacent to a corner or the rectangle. Angled plate 128 may be elevated above a central portion of conveyor system 135 and may extend across chassis 121 (e.g., transversely across chassis 121) for the attachment of robotically controlled carton remover system 160 thereto. A first drive motor and a second drive motor 127 (e.g., a drive system) may be generally located inboard from sides (e.g., the left side and the right side) of robotic carton unloader 100. The first drive motor may be configured to drive wheel 122, while second drive motor 127 may be configured to drive wheel 123. Other wheels, such as wheels 124, 125, may be configured to freewheel. Accordingly, drive motors, such as the first drive motor and the second drive motor 127, may drive and steer robotic carton unloader 100 within semi-trailer 10. As examples, rotating the first drive motor and the second drive motor 127 in the same direction may drive robotic carton unloader 100 forward or backward, rotating the first drive motor and the second drive motor 127 in opposite directions may pivot robotic carton unloader 100 about a point centered between drive wheels 122, 123, and rotating one of the first drive motor or the second drive motor 127 may pivot robotic carton unloader 100 about the opposite undriven drive wheel 122 or 123.

Conveyor System

As best seen in FIG. 2, conveyor system 135 includes a plurality of independently controlled conveyors to transport cartons 12. For example, the independently controlled conveyors may define an elongated "Z" shape conveyor system. In an embodiment, conveyor system 135 may be wider at the front (e.g., at the end of the conveyor closest to the carton pile 11) to receive cartons 12, and may narrow moving toward the rear (e.g., at the end of the conveyor farthest from the carton pile 11) along conveyor system 135. The narrowing of conveyor system 135 may position the unloaded cartons 12 in a line for discharge. Conveyor system 135 may comprise a rear portion 136a fixed relative to chassis 121, and a front portion 136b pivotally mounted to, and extending from, chassis 121. Rear portion 136a of conveyor system 135 may comprise a rear conveyor 137 and central conveyor 138. Rear conveyor 137 may comprise a portion 137a (e.g., a horizontal portion) that may be aligned with distribution center conveyor 19 for unloading cartons 12. Rear conveyor 137 may further comprise a portion 137b that is inclined to couple portion 137a with central conveyor 138. Central conveyor 138 may be positioned proximal (e.g., horizontal) to trailer floor 18 and may extend through chassis 121 from rear conveyor 137 to front portion 136b of conveyor system 135. Motor 139 may be coupled with rear conveyor 137 to drive rear conveyor 137, and motor 140 may be coupled to central conveyor 138 to drive central conveyor 138. As will be apparent to one with ordinary skill in the art in view of the teachings herein, any suitable number of motors 139, 140 may be used to drive conveyors 137, 138.

Conveyor arms 141 may pivotally extend (e.g., in a front direction toward the carton pile 11) from chassis 121 to support front portion 136b of conveyor system 135. Conveyor arms 141 may be rotatable about pivot 145. Front portion 136b of conveyor system 135 may comprise trailing conveyor 142 and leading conveyor 143. Conveyors 142, 143 may be positioned end-to-end between conveyor arms 141 to transport cartons 12 along conveyors 142, 143. Roller 144 may be positioned adjacent the distal end of leading conveyor 143 and may be configured to load cartons 12 onto leading conveyor 143. Roller 144 may be generally cylindrical and may extend transversely across an end of conveyor arms 141. Roller 144 may be powered by roller drive motor 147 coupled with conveyor arms 141. Leading motor 148 and trailing motor 149 are coupled with conveyor arms 141 to drive leading conveyor 143 and trailing conveyor 142 respectively.

Figure 3:
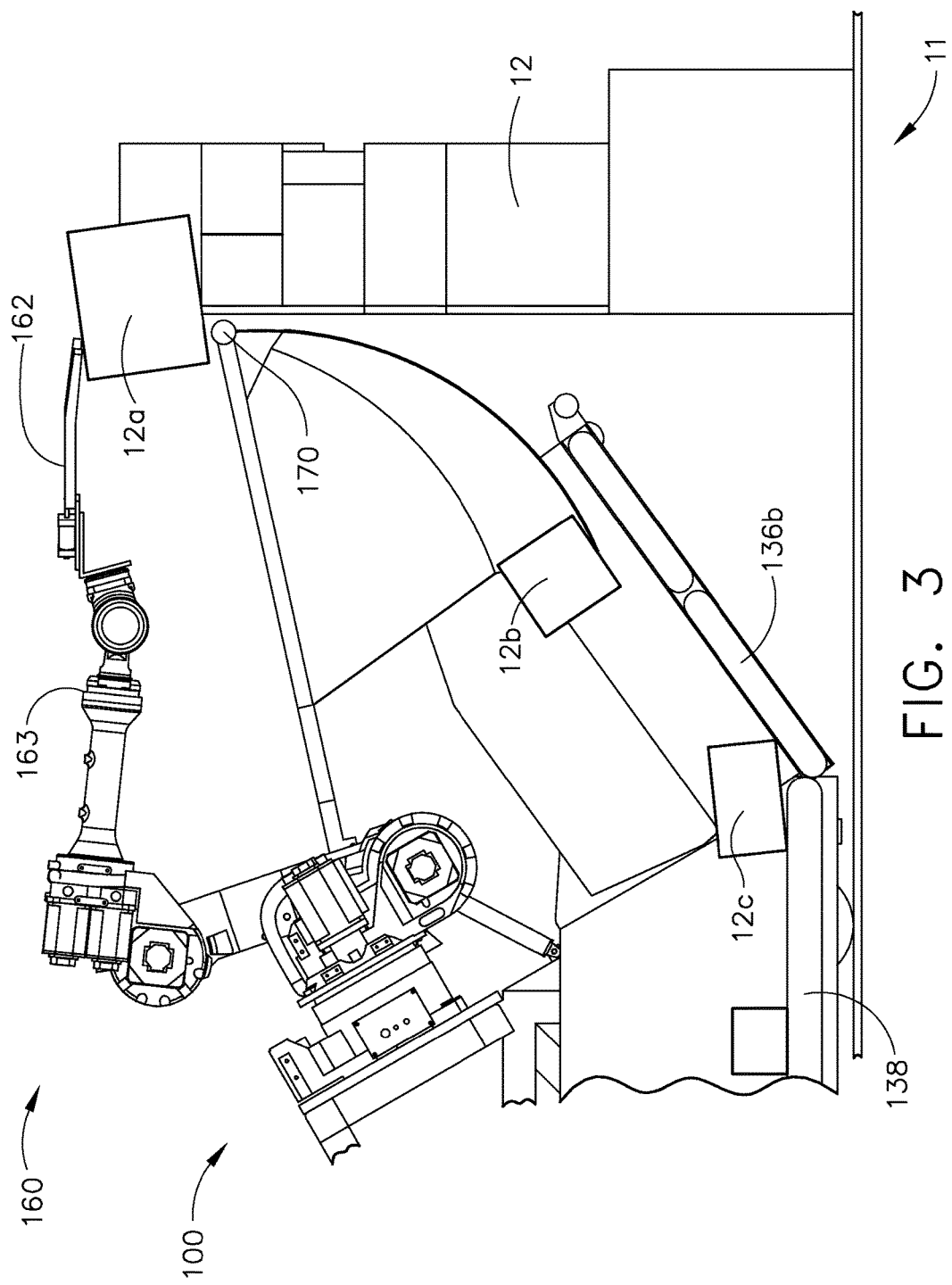
FIG. 3 is a partial side sectional view of the robotic carton unloader of FIG. 2, showing a portion of a conveyor system pivoted upwards.

Conveyor wheel 150 may be coupled with conveyor arms 141 to support front portion 136b on trailer floor 18. Lift 151 may operably connect between chassis 121 and conveyor arms 141 to lift the front portion 136b of conveyor system 135 off of the trailer floor 18 to any angular position relative thereto, such as but not limited to the angular position shown in FIG. 3. During operation, front portion 136b may be angled upwardly or downwardly relative to central conveyor 138. For instance, the angular position of front portion 136b may be adjusted to meet the changing height of carton pile 11. The front portion 136b may be angled to remain below the carton guide system 175. When carton pile 11 is at a maximum, the angular position is at a maximum, and when carton pile 11 is at a minimum, the angular position is at a minimum. As shown in FIG. 3, pivoting front portion 136b to an angular position may shorten the fall distance of carton 12 as it exits carton guide system 175 to fall or drop onto conveyor system 135. Lift 151 may be an electrical actuator such as a motor, but is not limited thereto.

Robotically Controlled Carton Remover System

Turning to FIGS. 1-4, robotically controlled carton remover system 160 may be configured to reach out (e.g., extend) from robotic carton unloader 100 to dislodge one or more cartons 12 (e.g., a plurality of cartons 12) from carton pile 11 with manipulator 162. As best seen in FIG. 3, manipulator 162 may be movably attached to a free end of robotic positioner 163. Base 163a of robotic positioner 163 is disposed adjacent angled plate 128 overlying central conveyor 138 of conveyor system 135. Robotic positioner 163 and manipulator 162 may be controlled by control and visualization system 180, and may be configured to dislodge or unload cartons 12 from anywhere on carton pile 11. The operating areas of robotic positioned 163 and manipulator 162 may extend from side-to-side and from floor-to-top of semi-trailer 10. Robotic positioner 163 may be any available robotic arm with five or six degrees of motion, such as the exemplary FANUC® Robot R-1000ia sold by FANUC® Robotics America Corporation, 3900 West Hamlin Road, Rochester Hills Mich. 48309-3253.

Figure 4:
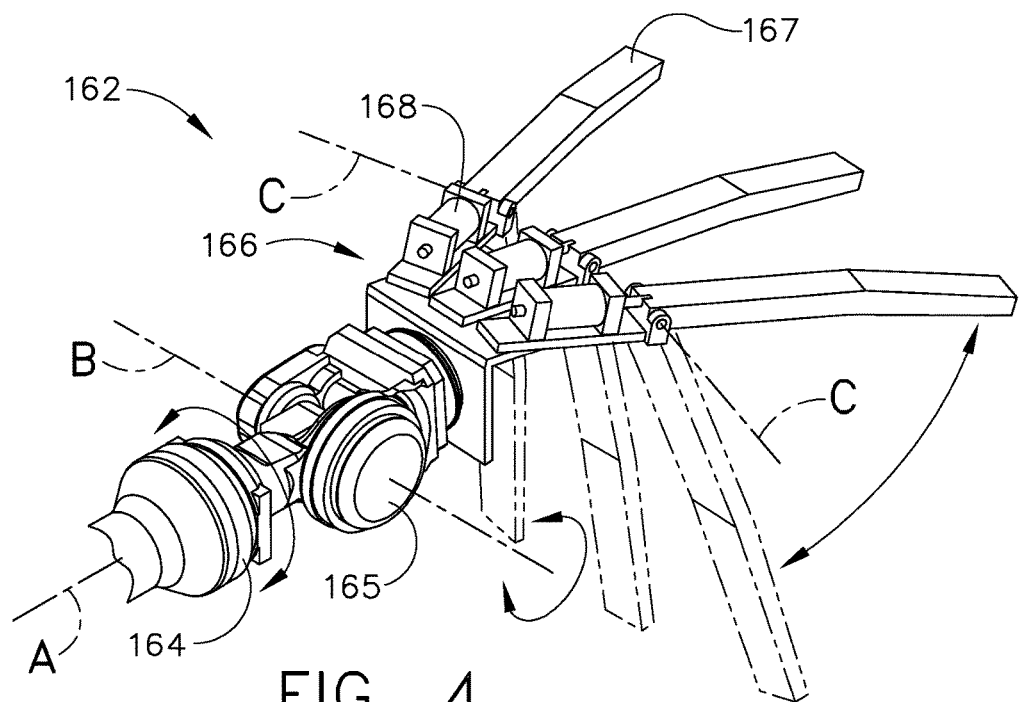
FIG. 4 is an isometric view of a manipulator of the robotic carton unloader of FIG. 1, showing movements of portions of the manipulator.
Figure 5:
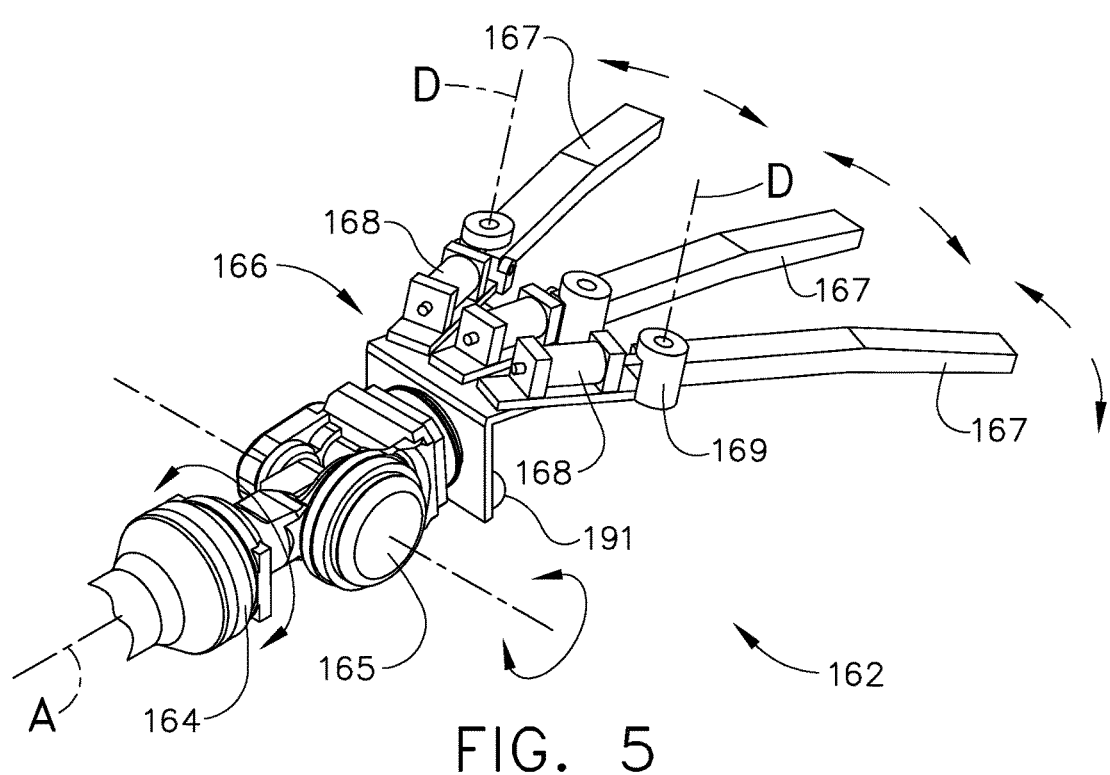
FIG. 5 is an isometric view of the manipulator of FIG. 4, showing a spreading movement of the manipulator.
Figure 6:
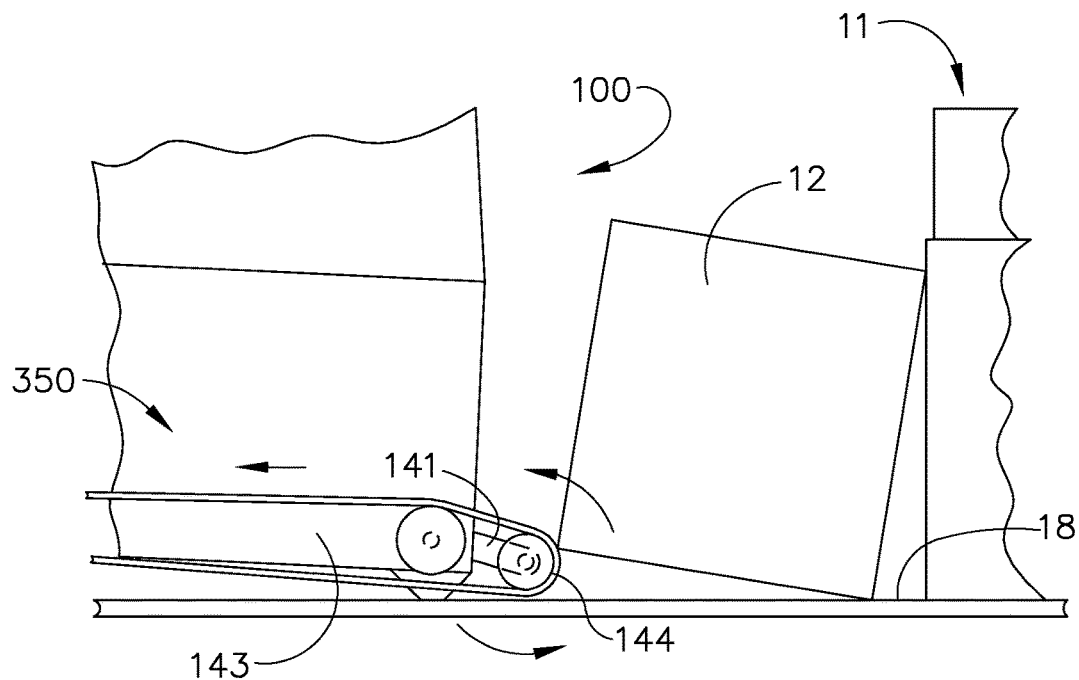
FIG. 6 is a partial side sectional view of the robotic carton unloader of FIG. 2, showing a rotating front roller lifting a carton from a floor of the truck.

As shown in FIG. 4, manipulator 162 may be rotatable about a wrist rotation joint 164 to rotate manipulator 162 about longitudinal axis A. Manipulator 162 may be further pivotable about wrist pivot joint 165 to pivot manipulator 162 about axis B oriented transverse to axis A. Manipulator 162 includes base 166 with at least one actuatable element, such as a claw 167 or finger, extending therefrom. As shown in this embodiment, base 166 may have two or more actuatable elements, such as three fingers 167, pivotally mounted to base 166 at their respective proximal ends. First actuator 168 may be connected to each actuatable element, such as each of fingers 167, to pivot fingers 167 downwardly relative to hand 166 about respective axes C, which is spaced from axis B as shown in FIG. 4. Second actuator 169 may be attached to hand 166 and to each of fingers 167 for spreading fingers 167 apart about axis D which is oriented transverse to axis C as shown in FIG. 5. First and second actuators 168, 169 may be, but are not limited to, electric or fluidic actuators. Fluidic actuators of the embodiments may operate with compressible fluids or with incompressible fluids.

Carton Guide System

Carton guide system 175 may be configured to guide unloaded or dislodged cartons 12 through robotic carton unloader 100, as shown in FIGS. 1 and 2. Carton guide system 175 may comprise a shelf 176, for example a carton deceleration skirt, located between carton remover system 160 and conveyor system 135. Shelf 176 comprises may comprise a surface 174. For example, the surface 174 may be a non-vertical surface, such as a curved surface. The shelf 174 may be configured to catch falling cartons 12 and guide the sliding dislodged cartons 12 onto conveyor system 135. Shelf 176 may be constructed from materials having a coefficient of friction configured to decelerate cartons 12 sliding thereon without stopping the sliding motion of cartons 12. Shelf 176 may be formed from various materials. As examples, shelf 176 may be formed from bendable or deflectable materials such as a fabric, a flexible plastic sheet, a pleated collapsible structure, etc. Carton guide system 175 may further comprise a pair of conveyor guides 177 positioned on each side of conveyor system 135. Conveyor guides 177 extend from conveyor arms 141 of front portion 136b of conveyor system 135 and may narrow toward at the rear portion 136a to guide cartons 12 onto conveyor system 135.

A frame 178 of carton guide system 175 may be pivotally attached to angled plate 128 of mobile body 120 (e.g., at a front side of angled plate 128 oriented toward the carton pile 11) such that carton guide system 175 extends outwardly from mobile body 120. In an embodiment, frame 178 may be generally U-shaped and may comprise a pair of frame arms 178a and 178b extending outwardly and spreading wider therefrom. Frame arms 178a and 178b may terminate at a cross member such as bumper 170 extending rigidly between frame arms 178a and 178b (e.g., from side to side at a front end closest to the carton pile 11). Bumper 170 may include outer cover 170a over a rigid core and may rotate. In one embodiment, at least a portion of bumper 170 may be a deflectable material such as an elastomer or a foam. Curved arrows are provided in FIG. 2 to show the directions of the pivotal motion of frame arms 178a, 178b relative to mobile body 120.

The previously described shelf 176 may be suspended from frame 178. Frame lift 179 may connect between the frame 178 and the angled plate 128 (see FIG. 1) to raise and lower frame 178, bumper 170, and shelf 176 (see arrows FIG. 2). Frame lift 179 can be an electrical actuator such as a motor but is not limited thereto. As will be described in greater detail later, frame lift 179 may place bumper 170 against the wall of carton pile 11 below cartons 12 being removed to stabilize the wall of carton pile 11 below the cartons 12 being removed. The deflection properties of shelf 176 may provide robotically controlled carton remover system 160 access to cartons 12 resting on trailer floor 18 when shelf 176 is lowered into contact with at least part of conveyor system 135 and collapses or reduces in height from the contact.

Control and Visualization System

Control and visualization system 180 may coordinate and control all of the functions of the systems of the robotic carton unloader 100. Control and visualization system 180 may be configured to operate robotic carton unloader 100 to automate at least a portion of the unloading process. Control and visualization system 180 may include control module 181, power supply 182, and robotics controller 183, positioned within chassis 121. Control and visualization system 180 provides timing, sequencing, homing routines, and motion control for drive motors 126, 127, conveyor drive motors 139, 140, 148, 149, roller drive motor 147, front lift 151, frame lift 179, robotic positioner 163 and manipulator 162.

Operator interface 185 may be coupled with chassis 121 and extends inwardly above a portion of conveyor system 135. Operator interface 185 may include joystick 186, display 187, and keypad 188. Joystick 186 may be a multi-purpose control and can be configured to control movement of robotic positioner 163 and manipulator 162. Joystick 186 may be reconfigured (via selections on keypad 188) to steer, drive, and stop robotic carton unloader 100. Display 187 may display a wide variety of information that includes but is not limited to error messages, calibration information, status indicators, systems fault warnings, and can display lines of software code entered or edited on keypad 188. Keypad 188 may be used to enter software code for motion control of the robotic arm, conveyor system 135, drive motors 126, 127, lifts 151, 179, and conveyor drive motors 139, 140, 148, and 149.

Control and visualization system 180 may include visualization sensors such as a wall proximity sensor 193 for preventing robotic carton unloader 100 from colliding with the wall of carton pile 11. Wall proximity sensor 193 may be an electrical sensor attached to at least one of conveyor guides 177, such as at a front of the robotic carton unloader 100, for measuring proximity between the at least one proximity sensor 193 and carton pile 11. When wall proximity sensor 193 senses that robotic carton unloader 100 is at a desired distance from carton pile 11, control and visualization system 180 may stop robotic carton unloader 100.

Upper carton sensor 189 may be mounted on frame 178 to indicate contact of frame 178 with carton pile 11. Upper carton sensor 189 may be a contact switch adjacent to bumper 170 that trips when bumper 170 contacts the face of carton pile 11. Or, in another embodiment, upper carton sensor 189 may be a distance sensor that detects a distance to the face of carton pile 11. An angle position indicator may connect between angled plate 128 and frame 178 to indicate an angle between angled plate 128 and frame 178. When bumper 170 is contacting carton pile 11, the angle position indicator may provide control and visualization system 180 with angular positional data that can be used to compute the location of the wall of carton piles 11 relative to robotic carton unloader 100 and manipulator 162 of robotically controlled carton remover system 160. As an example, the angle position indicator may be a potentiometer.

Carton sensor 191 may be attached to base 166 of manipulator 162 (FIG. 5) so that the carton extraction or unloading area adjacent to manipulator 162 may be viewed or scanned. For instance, carton sensor 191 may measure the distance to a selected carton 12 so that manipulator 162 may be appropriately positioned to extract or unload the selected carton 12. In an alternate embodiment, carton sensor 191 may be a carton edge detector. A visualization sensor may be attached to angled plate 128 of chassis 121 for viewing the inside of semi-trailer 10, robotically controlled carton remover system 160 and cartons 12 within carton pile 11.

Operation

During operation, an operator may start robotic carton unloader 100 to initiate a startup and homing sequence to verify operation of the various systems and to move systems components to a home position. For example, control and visualization system 180 may undergo test routines to calibrate and home robotically controlled carton remover system 160, to pivot and position frame 178 behind a leading edge of robotic carton unloader 100, and to test activate conveyors of conveyor system 135. After the startup tests and homing routines are completed, the operator manually may select a drive selection on operator interface 185, and uses joystick 186 to steer and drive robotic carton unloader 100 into semi-trailer 10. Robotic carton unloader 100 may be advanced into semi-trailer 10 until the at least one proximity sensor 193 signals to the operator, via control and visualization system 180, that robotic carton unloader 100 is positioned adjacent to carton pile 11.

Upper carton sensor 189 may be used to identify a height and a front of carton pile 11, and control and visualization system 180 can use this information to position manipulator 162 adjacent to the identified position of carton pile 11. Carton sensor 191 on manipulator 162 may rescan carton pile 11 to refine the carton location data to ensure accurate selection and unloading of cartons 12.

FIG. 2 shows robotic carton unloader 100 unloading cartons 12 from semi-trailer 10 and the arrows are provided to show the paths of a plurality of cartons 12a-12h as they are unloaded from carton pile 11 and through robotic carton unloader 100. In FIG. 2, control and visualization system 180 selected carton 12a for unloading from carton pile 11 (e.g., the top of the carton pile 11), and robotically controlled carton remover system 160 is raking or dislodging carton 12a from carton pile 11.

Carton 12a may be tipped and drawn back by manipulator 162 towards shelf 176. Note that bumper 170 of carton guide system 175 may be pressed (e.g., deliberately) against carton pile 11 directly below carton 12a to stabilize carton pile 11 therebelow. Once the top row of cartons 12 is removed from carton pile 11, control and visualization system 180 can actuate frame lift 179 and possibly drive motors 126, 127 to reposition bumper 170 and carton guide system 175 against carton pile 11 below the new topmost row of cartons 12 slated for removal.

Turning back to FIG. 2, carton 12b is sliding down and off curved shelf 176 just prior to falling or dropping onto the moving conveyor system 135. Carton 12c is transiting from trailing conveyor 142 onto central conveyor 138 to join carton 12d traveling rearward thereon. Cartons 12e and 12f are moving upwards and rearwards along portion 137b of rear conveyor 137. Unloaded carton 12g is shown discharging from portion 137a of rear conveyor 137, and onto distribution center conveyor 19 for delivery into the distribution center. As the height of carton pile 11 is reduced, frame lift 179 may lower carton guide system 175 downward.

In an embodiment, when shelf 176 may be lowered into contact with conveyor system 135, shelf 176 may be operatively configured to deflect or collapse against conveyor system 135. This deflection or collapse may reduce the height of shelf 176, which may enable robotically controlled carton remover system 160 to reach over the collapsed shelf 176 to reach lower cartons 12. Once a dislodged lower carton 12 may be drawn onto the collapsed shelf 176, robotically controlled carton remover system 160 and shelf 176 may be raised to dump carton 12 onto conveyor system 135.

As described previously and best shown in FIG. 6, roller 144 may be located adjacent to conveyor system 135 and may be rotated by roller drive motor 147. As shown, roller 144 is cylindrical with a length and a circular cross section. Roller 144 is rotated in a direction that lifts any carton 12 upwardly when contacted by roller 144. Once lifted, the rotating roller 144 can draw carton 12 downstream onto roller 144 and onto moving conveyor system 135 for extraction. These processes may repeat as required until all of the cartons 12 are unloaded from semi-trailer 10.

Alternate Embodiments

Figure 7:
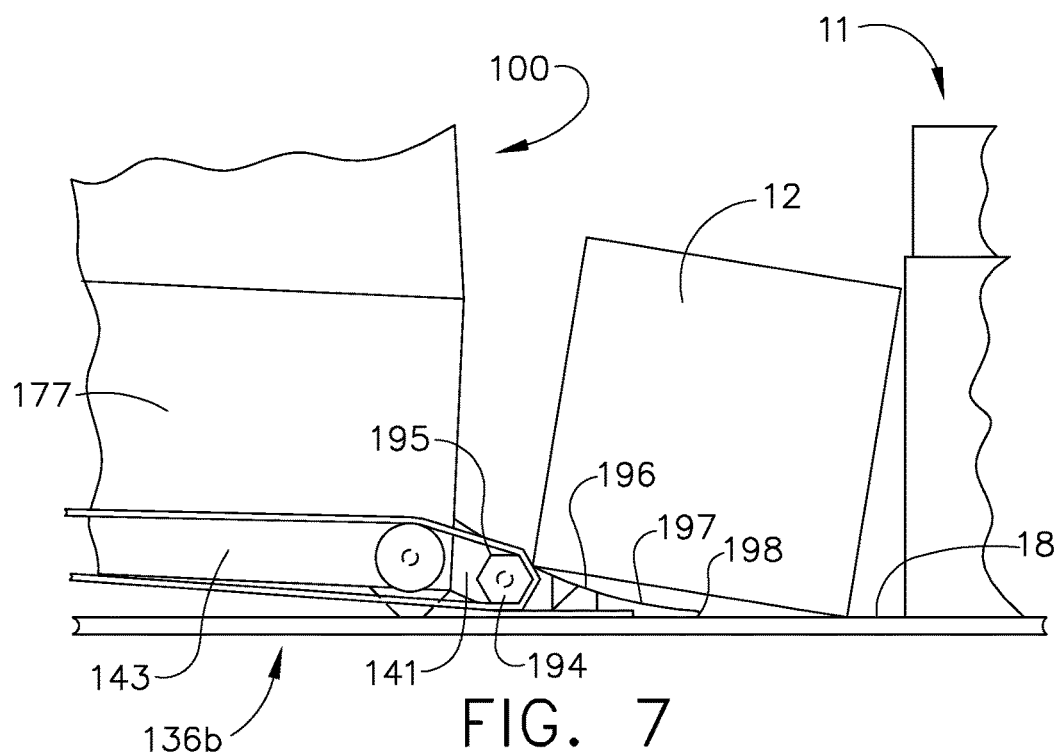
FIG. 7 is a partial side sectional view of an alternate embodiment of a robotic carton unloader having a roller with corners and a carton scoop.

FIG. 7 shows an alternate roller 194 having a length and a non-circular cross section such as a hexagonal cross section. Other suitable cross section configurations for roller 194 may be used, such as octagonal or ribbed cross section. The non-circular cross section extends lengthwise along roller 194 and is placed in front of conveyor system 135. Roller 194 may have a plurality of roller corners 195 extending lengthwise along the alternate roller 194 and when rotated, roller corners 195 create rotating ridges of high pressure that impact and dig into cartons 12. The combinations of upward rotating lines of pressure and impact have been proven to be effective in dislodging cartons 12.

FIG. 7 further includes carton scoop 196 extending from conveyor arms 141 frontwards of roller 194. Carton scoop 196 may be wedge shaped and at least a portion of carton scoop 196 can be a curve 197. Leading edge 198 of carton scoop 196 may be driven underneath carton 12 resting on floor 18. Carton scoop 196 may be configured to act as an inclined ramp that lifts and tilts carton 12 while moving underneath. As shown, the tilted carton 12 in FIG. 7 may have at least one edge thereof lifted off floor 18. Carton 12 then slides and rides up along carton scoop 196 until contacting rotating roller 194 to further lift and pull carton 12 downstream onto conveyor system 135. While carton scoop 196 is shown with roller 194, carton scoop 196 may, in another embodiment, also be used with roller 144. Additionally, in another embodiment, carton scoop 196 may be used without rollers 194 or 144 and can attach directly in front of moving conveyor system 135 (not shown).

While robotic carton unloader 100 is described above for unloading a semi-trailer 10, robotic carton unloader 100 of the present embodiment is not limited for use solely thereto, and is well suited for unloading cartons 12 in other settings such as within a store, a warehouse, a distribution center, an unloading bay, between product aisles, a rack, a pallet, and a freezer.

With respect to the actuators and lifts described as first and second actuators 168, 169 or frame lift 179, these actuators are not limited to electrical actuators, but can be a fluidic actuator operable with compressible or incompressible fluids such as air and oil.

The foregoing description of an embodiment has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. Although only a limited number of embodiments of the invention are explained in detail, it is to be understood that the invention is not limited in its scope to the details of construction and arrangement of components set forth in the preceding description or illustrated in the drawings. The invention is capable of other embodiments and of being practiced or carried out in various ways. Also, in describing the embodiment, specific terminology was used for the sake of clarity. It is to be understood that each specific term includes all technical equivalents which operate in a similar manner to accomplish a similar purpose. It is intended that the scope of this provisional filing will be better defined by the claims submitted with a later non-provisional filing.

What is claimed is:

1. A robotic carton unloader for unloading a carton pile, comprising:
   a conveyor system;
   a manipulator movably attached to an end of a robotic positioner and configured to dislodge one or more cartons from the carton pile;
   a frame pivotally attached to the robotic carton unloader with at least one pivot, comprising:
   a pair of frame arms extending outwardly from the at least one pivot;
   a bumper that extends between the pair of frame arms and configured to pivotally move relative to the robotic carton unloader into pressing contact against a front face of cartons in the carton pile directly below the one or more cartons being dislodged from the carton pile by the manipulator, the bumper stabilizing the carton pile directly below the one or more cartons being dislodged with pressure applied by the bumper; and
   a shelf attached to the frame and configured to catch the one or more cartons dislodged from the carton pile and guide the one or more cartons dislodged from the carton pile onto the conveyor system,
   wherein when one or more cartons are dislodged, the frame is configured to pivotally reposition the bumper to apply pressure directly below the one or more cartons being dislodged, the pressing contact further stabilizes cartons in the carton wall below the bumper as the one or more cartons are dislodged.

2. The robotic carton unloader of claim 1, wherein the one or more cartons comprises a plurality of cartons.

3. The robotic carton unloader of claim 2, further comprising a frame lift connected to the frame and configured to raise and lower the frame.

4. The robotic carton unloader of claim 3, further comprising a control and visualization system connected to the conveyor system, the manipulator, the robotic positioner, and the frame lift, wherein the control and visualization system is configured to automatically control the conveyor system, the manipulator, the robotic positioner, and the frame lift to unload the carton pile.

5. The robotic carton unloader of claim 4, wherein the cover is an elastomer.

6. The robotic carton unloader of claim 1, wherein the bumper comprises a cover over a rigid core.

7. The robotic carton unloader of claim 1, wherein the bumper comprises a roller rotatable over a rigid core.

8. The robotic carton unloader of claim 1, wherein the shelf is curved.

9. The robotic carton unloader of claim 1, wherein the shelf is configured to decelerate the one or more cartons dislodged from the carton pile.

10. The robotic carton unloader of claim 1, wherein the manipulator includes at least one actuatable element configured to draw the one or more cartons toward the shelf to dislodge the one or more cartons from the carton pile when actuated.

11. The robotic carton unloader of claim 10, wherein the at least one actuatable element is two or more actuatable elements.

12. The robotic carton unloader of claim 10, wherein the actuatable element is a claw.

13. The robotic carton unloader of claim 10, further comprising a control and visualization system connected to the conveyor system, the manipulator, and the robotic positioner, wherein the control and visualization system is configured to automatically control the conveyor system, the manipulator, and the robotic positioner to unload the carton pile.

14. The robotic carton unloader of claim 13, further comprising a carton sensor connected to the control and visualization system and configured to detect a distance from the bumper to the carton pile.

15. The robotic carton unloader of claim 13, further comprising a carton sensor connected to the control and visualization system and configured to detect contact of the bumper with the carton pile.

16. The robotic carton unloader of claim 1, wherein the carton pile is a carton pile stacked within a trailer.

17. The robotic carton unloader of claim 16, further comprising:
   a mobile body; and
   a drive system attached to the mobile body, the drive system including a plurality of wheels for driving and steering the mobile body, wherein the conveyor system, the manipulator, the robotic positioner, and the frame are coupled to the mobile body.

18. A robotic carton unloader for unloading a carton pile, comprising:
   a conveyor system;
   a manipulator movably attached to an end of a robotic positioner and configured to dislodge one or more cartons from the carton pile; and
   a frame pivotally attached to the robotic carton unloader with at least one pivot, comprising:
   a pair of frame arms extending outwardly from the pivot;
   a cross member extending between frame arms at a front end thereof closest to the carton pile;
   a bumper attached to the cross member and configured to be pivotally repositioned into pressing contact against a front face of cartons in the carton pile directly below the one or more cartons being dislodged from the carton pile by the manipulator, the bumper stabilizing the carton pile directly below the one or more cartons being dislodged with pressure applied by the bumper; and
   a shelf attached to the frame and configured to catch the one or more cartons dislodged from the carton pile and guide the one or more cartons dislodged from the carton pile onto the conveyor system,
   wherein when one or more cartons are dislodged, the frame is configured to pivotally reposition the bumper into pressing contact at any height on the carton pile directly below the new topmost one or more cartons slated for removal.

19. The robotic carton unloader of claim 18, wherein the pair of frame arms extend outwardly from the at least one pivot and spread wider therefrom.

20. The robotic carton unloader of claim 18, wherein the frame is configured to pivotally move in an arc towards and away from the floor.

\* \* \* \* \*